Aug. 1, 1933.   G. R. MEYERCORD ET AL   1,920,418
MEANS FOR CONVEYING AND CLEANING COTTON IN A HARVESTING MACHINE
Filed June 3, 1931   3 Sheets-Sheet 1
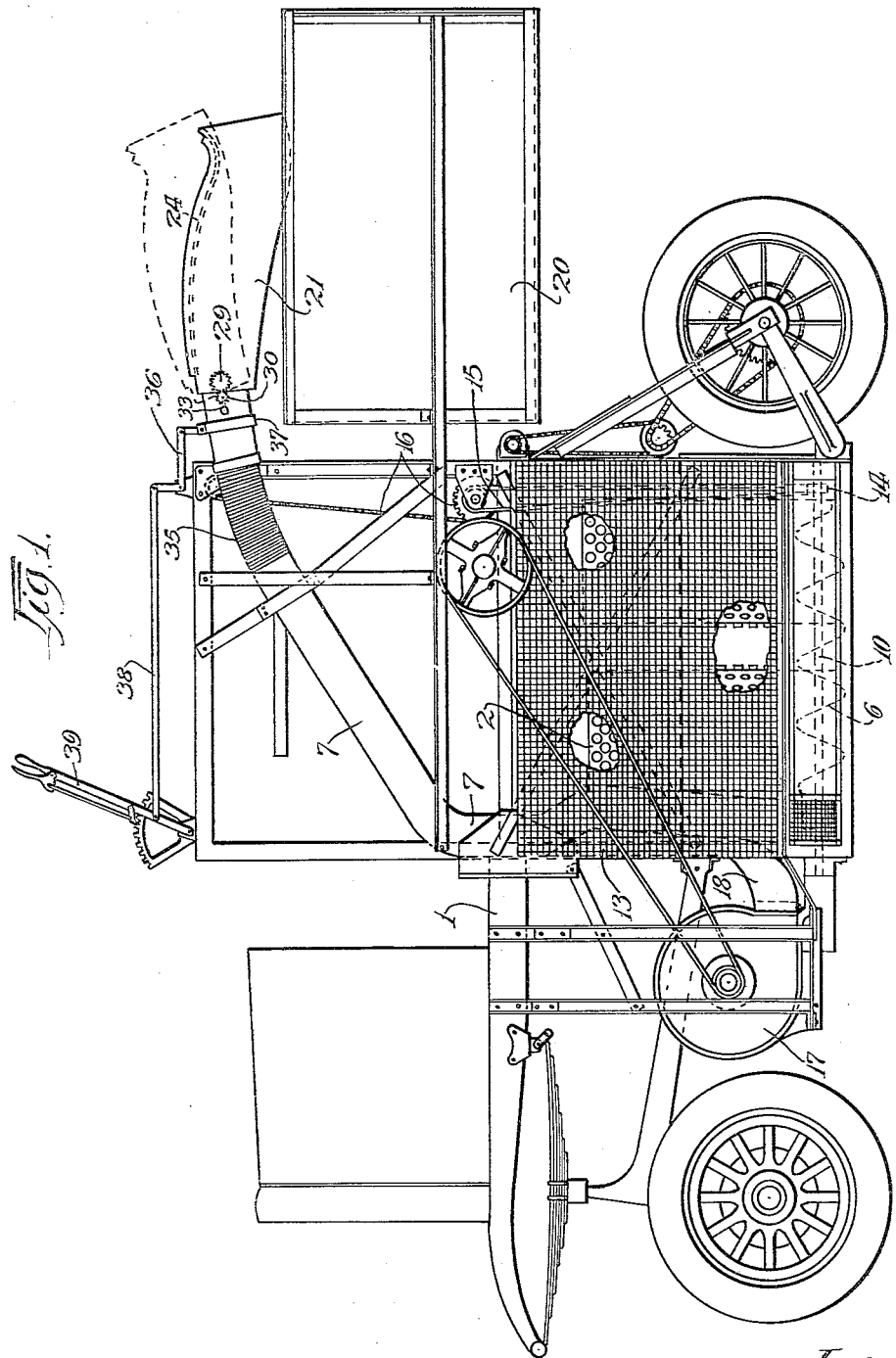

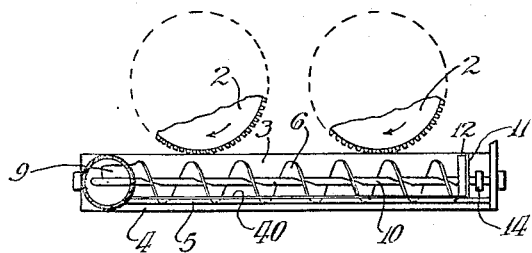
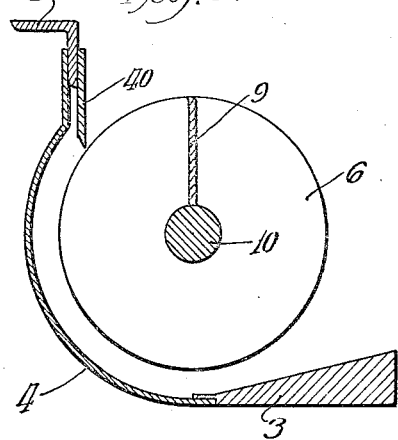
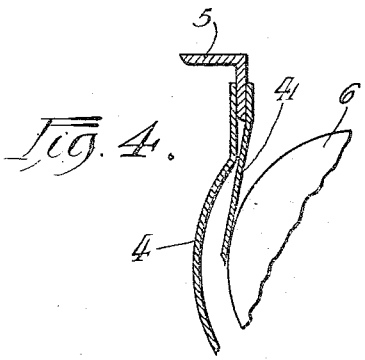
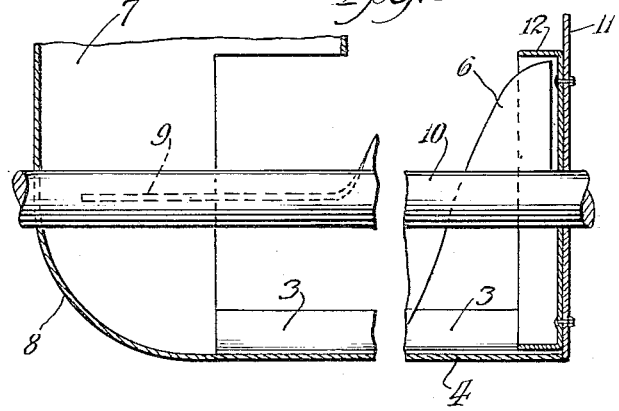

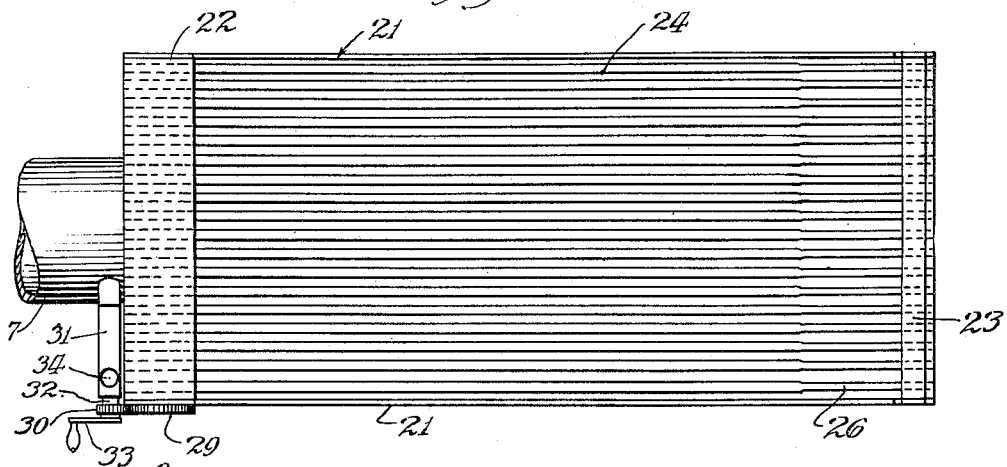
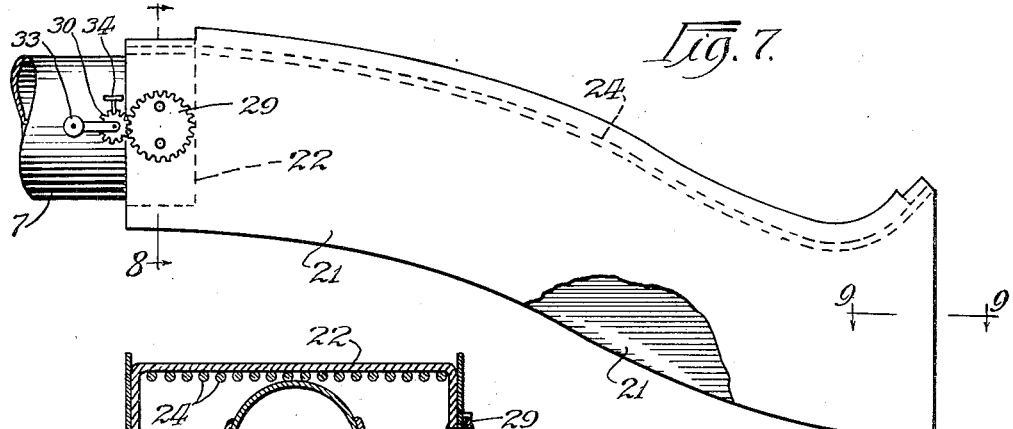
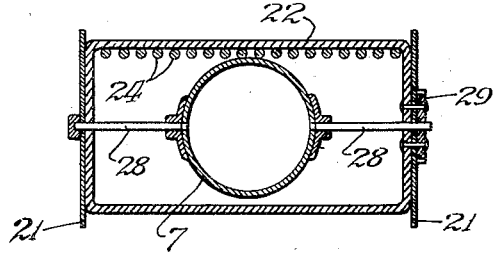
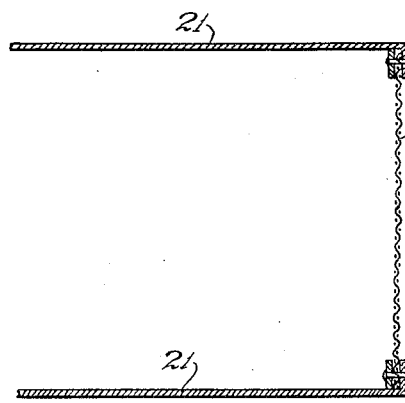

Patented Aug. 1, 1933

1,920,418

UNITED STATES PATENT OFFICE 1,920,418

MEANS FOR CONVEYING AND CLEANING COTTON IN A HARVESTING MACHINE

George R. Meyercord and William Waterman, Chicago, Ill.; said Waterman assignor to said Meyercord Application June 3, 1931. Serial No. 541,758

12 Claims. (Cl. 56—14)

The present invention relates to the reception of cotton from the picking means in a harvesting machine and the delivery of the cotton into a box or container at a remote point; and has for its object to produce a simple and efficient apparatus for this purpose that will be reliable, avoid injuring the cotton, and effect at least a partial cleaning of the cotton.

Cotton brought to the inlet end of a conduit may successfully be drawn into the same by a suction and then be carried through the conduit to a remote point by a positive air current. The present invention, viewed in one of its aspects, relates particularly to the means for collecting cotton from the pickers and successfully delivering it to the conduit. Viewed in another of its aspects, the present invention relates to the means for discharging the cotton from the conduit so as at least partially to clean the cotton and, if desired, vary the point at which it enters the container or box to facilitate even loading of the latter.

The various features of novelty whereby our invention is characterized will hereinafter be pointed out with particularity in the claims; but, for a full understanding of our invention and of its objects and advantages, reference may be had to the following detailed description taken in connection with the accompanying drawings, wherein:

Figure 1 is a side view of a cotton harvesting machine embodying our invention; Fig. 2 is a top plan view, on the same scale as Fig. 1, of the receiving trough with its screw conveyer, the conveying conduit being shown in section, and fragments of the picking drums that discharge into the trough being also shown; Fig. 3 is a transverse section, on a larger scale, through the trough and the screw conveyer; Fig. 4 is a view similar to Fig. 3, illustrating a modification, only fragments of the trough and conveyer being shown; Fig. 5 is a longitudinal vertical section through the trough and the lower end of the conduit, the middle portion of the trough being broken away, and the screw conveyer being shown in elevation; Fig. 6 is a top plan view, on a larger scale than Fig. 1, of the discharge end of the conduit; Fig. 7 is a side view of the parts shown in Fig. 6; Fig. 8 is a section on line 8—8 of Fig. 7; and Fig. 9 is a section on line 9—9 of Fig. 7.

Referring to the drawings, 1 represents the frame of a wheeled vehicle adapted to be run along the rows of cotton plants in a field and provided with rotating drums 2, of which two, located on one side of the machine, are illustrated. These drums, as viewed in Fig. 2, rotate in the clockwise direction, the cotton being thrown off tangentially on the sides which are the lower sides in Fig. 2. This type of picking or harvesting machine is well known, and will, therefore, not be described in detail. It will be seen that the drums are vertical, one being arranged in front of the other. Along the outer side of the drums, below the bottom of the picking areas thereon, is a long trough into which the cotton is thrown from the drums. In the arrangement shown, this trough is composed of a long plank 3, the inner edge of which is close to the drums and the top of which slopes downwardly away from the drums and joins a part 4 which is simply a plate of sheet metal in the form of a segment of a cylinder, the part or member 4 completing the bottom of the trough and forming an outer side wall. The upper edge of the member 4 is stiffened by an angle iron 5 to one flange of which it is secured and which extends throughout the length of the trough. Within the trough is a long conveyer screw 6, turning in such a direction as to move the cotton that enters the trough toward the forward end of the latter. Above the forward end of the trough is a large upright conduit 7, the lower end of which is continued downward to form a curved front wall 8 for the trough. The conveyer screw terminates at the forward end in a wing or vane 9 that is parallel with the conveyor shaft 10 and is shaped so that its forward edge follows the contour of the front wall 8 of the trough as the screw revolves. The radial width of this ring or vane is somewhat less than the radius of the screw. The purpose of this wing or vane is to keep the cotton continually moving to facilitate its being drawn up into the conduit; the rotating vane preventing the cotton and trash from packing itself into the forward end of the trough. At the rear end of the trough is a cross wall 11 having an annular pan-shaped member 12 extending around and projecting forwardly over the rear end of the conveyer screw, so that the cotton will not fall behind the rear end of the screw. Above the trough, outside of the drums, is a coarse screen 13 against which some of the cotton leaving the drums may be thrown and caused to drop down into the trough.

The conveyer screw is driven in a suitable manner. In the arrangement shown, it is provided at its rear end with a pulley 14 over which runs a belt 15, as shown in Fig. 1; the belt passing around a pulley supported on the framework above the drums and driven from the power plant of the machine (not shown), through driving mechanism of which the last element is a sprocket chain drive 16.

Forwardly of the conduit 7 is a blower 17 whose discharge pipe 18 connects with the conduit 7 at a point above the trough; the air from the blower being blown upwardly through the conduit and thus creating a partial vacuum at the inlet end of the latter. This partial vacuum is sufficient to cause the cotton to be drawn up into the conduit from the forward end of the trough and carried into the stream of air discharged into the conduit by the blower. Upon entering this stream, the cotton travels along with it until it is finally discharged at the outlet end of the conduit.

At the rear end of the vehicle is a large elevated box or container 20 open at the top. The conduit 7, after extending upwardly for some distance, is bent at an obtuse angle and then continues upwardly and rearwardly to a point above the box, so that the cotton carried up through the conduit will be discharged into the box. It is desirable that the cotton be deflected out of the air stream and be thrown into the box while the air stream passes on without entering the box. We have, therefore, provided the discharge end of the conduit with a head that will deflect the oncoming cotton and cause it to be thrown down into the box; while permitting the air to continue on. The head is so designed that not only the stream of air, but also dust, dirt and fine trash, will escape into the surrounding atmosphere, thus causing the cotton to enter the box in a cleaner state than that in which it is while traveling through the conduit.

In the arrangement shown, the head consists of two vertical plates 21, 21 spaced apart by and secured to a stiff frame-like member 22 at their forward ends, and connected at the top, at their rear ends, by a cross bar 23. A series of parallel rods 24, spaced apart a short distance from each other and from the side plates, connect the upper member of the frame 22 to the bar 23, being conveniently welded at their ends to the frame and bar, respectively. The rods are preferably curved downward gradually from their forward ends and then curve upward rather abruptly in the vicinity of their rear ends. When the mixture of air, cotton and trash is blown into the head, the large pieces of solid matter strike the rods, the air continues on through the spaces between the rods, as does also the fine foreign matter and small trash, whereas the cotton is deflected and is thrown down into the box. Spanning the space between the rear ends of the side plates of the head is a screen 25, conveniently of wire mesh. Any cotton that tends to slide along the rods and the discharge in the rearward direction will strike the screen and thus be certain of dropping down into the box that is to receive it. Furthermore, dust and other fine foreign matter mixed with the cotton, when the latter strikes the screen, will pass on through the screen. The rods are reduced in thickness in the direction transversely of the head, as indicated at 26, from about the point where they begin their upward turn, thus increasing the width of the spaces between the rods. Occasionally trash or cotton will lodge between the rods and will slide along the same toward the forward end of the head. By widening the passages or channels between the rear ends of the rods, such trash or cotton will escape through the same, and clogging the passages or channels will be avoided.

The stream that carries the cotton into the head should impinge on the rods, but the angle between the rods and the direction of flow of the stream should be varied, as conditions that are encountered vary, in order to secure the greatest efficiency. Means are, therefore, provided for adjusting the head upon the conduit in order to vary this angle at will. In the arrangement shown, the rear end of the conduit extends into the frame-like member at the upward end of the head, and is provided with journals 28 which project through the vertical members of the frame 22 and form a hinge connection between the head and the conduit. Fixed to one side of the head, coaxial with the journals, is a gear wheel 29 meshing with a pinion 30 rotatably supported on the conduit. In the arrangement shown, there is a bracket 31 extending laterally from the conduit fixed on a shaft 32, the pinion rotatably supported in the bracket. The pinion is provided with a crank 33 by means of which it may be turned. It will be seen that, upon swinging the crank downward, the rear end of the head will be swung down, whereas, by swinging the crank up, the rear end of the head is raised. The head may be locked in an adjusted position in any suitable manner as, for example, by a screw 34 adapted to serve as a set screw engaging with the shaft 32 to hold it against rotation. In order to vary the point at which the cotton enters the box or container and thus facilitate even loading of the latter, it is desirable to raise and lower the head with respect to the box or container for the cotton, without varying the angle of incidence of the stream of air and cotton with respect to the rods or grill. Therefore, the conduit is provided with a flexible section 35 near its rear end, whereby the head may be moved up and down, along with the immediately adjacent portion of the conduit. In order to permit the head to be adjusted in this manner, we support on the vehicle frame above the rear end of the conduit a bell crank lever 36 that is connected to the conduit rearwardly of the flexible section therein, conveniently by securing one arm of the bell crank lever to a band or strap 37 surrounding the conduit. Operating rod 38, connected at its rear end to the other arm of the bell crank lever, extends forwardly to a point within reach of the driver, and is there secured to a suitable hand lever 39. By shifting the hand lever, the head may be swung up and down at will.

Sometimes vines or long stems encountered in a field will come into engagement with the conveyer screw, wrapping themselves around the same, and interfering with the proper operation of the conveyor. To prevent wrapping of vines or the like around the screw, we place above the screw, at the outer side of the trough, as best shown in Fig. 3, a long knife 40 whose cutting edge lies close to the periphery of the screw, or, if desired, the knife blade may be made wider and of resilient material, as indicated at 41 in Fig. 4; this blade actually contacting with the periphery of the screw along a tangential line. Any vines or the like that may be drawn into the screw will be cut off by the knife which extends throughout the entire length of the screw. In this connection, it may also be noted that the protecting shield 12 at the rear end of the screw will prevent vines from getting behind the screw, which would make it easy for them to become wrapped around the same.

It will be seen that, in accordance with our invention, the cotton that is discharged from the picking drums is handled in such a manner as not to injure the fiber or crush the seed, but the cotton is conveyed in a loose condition from the trough to the box or container at the rear of the machine. Not only is the cotton effectively handled without danger of injury to the same, but it is dried more or less by the air currents, and most of the dust, dirt, and small trash is separated therefrom, so that only the larger pieces of trash accompany the cotton into the box or container therefor. Furthermore, the discharge had may be quickly and easily adjusted to secure at all times the best distribution of the cotton within the box and the best results as to cleaning of the cotton and its deflection from the air current into the box.

While we have illustrated and described with particularity only a single preferred form of our invention, we do not desire to be limited to the exact structural details thus illustrated and described; but intend to cover all forms and arrangements which come within the definitions of our invention constituting the appended claims.

We claim:

1. In a cotton harvesting machine having means to pick cotton and discharge it in a predetermined zone, a trough positioned to receive the cotton thus discharged, a conveyer screw in said trough, a conduit extending transversely of the screw and having an open end adjacent to the forward end of the screw, and means to produce a suction in said conduit in a direction to draw the cotton at the front end of the screw into the conduit.

2. In a cotton harvesting machine having means to pick cotton and discharge it in a predetermined zone, a trough positioned to receive the cotton thus discharged, a conduit rising from one end of the trough and having a portion extending downwardly and inwardly to form an end wall of the trough, a conveyer screw in the trough to feed the cotton toward said end wall, and means to produce an upward suction through the lower end of the conduit.

3. In a cotton harvesting machine having means to pick cotton and discharge it in a predetermined zone, a trough positioned to receive the cotton thus discharged, an open-ended conduit having its inlet end at one end of the trough, a conveyer screw in the trough to move the cotton to said end of the trough, a box for receiving the cotton from the conduit located at the outlet end of the conduit, and means to blow air into the conduit in the direction of the outlet end of the conduit from a point between the ends of the conduit.

4. In a cotton harvesting machine having means to pick cotton and discharge it in a predetermined zone, a trough positioned to receive the cotton thus discharged, a box to house the cotton at a point remote from the trough, a long, open-ended conduit having its inlet end at one end of the trough and its outlet end at the box, means in the trough to move the cotton along the same to said conduit, and pneumatic means to cause the cotton, upon reaching the inlet end of the conduit, to flow through the conduit to said box.

5. In a cotton harvesting machine having means to pick cotton and discharge it in a predetermined zone, a trough positioned to receive the cotton thus discharged, a conveyer screw in the trough to move the cotton therein to one end of the trough, means at said end to carry away the cotton, and a long stationary knife blade extending along the trough in proximity to the screw.

6. In a cotton harvesting machine having a box to receive and store the cotton that is harvested, a conduit adapted to convey the cotton to the box, means to move the cotton through the conduit pneumatically, a head on the outlet end of the conduit above the box and open on the under side, the top wall of the head having openings therein for the escape of air, dust, and small trash, said head being so disposed that the angle of incidence of the oncoming stream from the conduit with respect to the top wall of the head is acute, and means to adjust said head relatively to the conduit to vary said angle.

7. In a cotton harvesting machine having a box to receive and store the cotton that is harvested, a conduit adapted to convey the cotton to the box, means to move the cotton through the conduit pneumatically, a head on the outlet end of the conduit above the box and open on the under side, the top wall of the head having openings therein for the escape of air, dust, and small trash, said conduit having therein, near the head, a flexible section, to permit said head and the adjacent part of the conduit to be adjusted into various positions with respect to the box, and means for holding the head in any one of such various positions.

8. The combination with the conduit of a pneumatic conveyer for cotton, of a long head on the outlet end of the conduit, said head being open on the under side and the top of the head being formed of longitudinal rods spaced apart from each other, the spaces between the rods being greater toward the ends of the rods remote from the conduit.

9. The combination with the conduit of a pneumatic conveyer for cotton, of a long head on the outlet end of the conduit, said head being open on the under side and the top of the head being formed of longitudinal rods spaced apart from each other, the spaces between the rods being increased in width at a point remote from the conduit, and the outer end wall being in the form of a screen.

10. The combination with the conduit of a pneumatic conveyer for cotton, of a long head on the outlet end of the conduit, said head being open on the under side and the top of the head being formed of longitudinal rods spaced apart from each other, said rods curving downward gradually as they recede from the end of the conduit and then curving sharply upward at their outer ends.

11. The combination with the conduit of a pneumatic conveyer, of a long head much wider than the conduit at the discharge end of the latter, the bottom of the head being open, the outer end wall of the head being in the form of a screen, and the top of the head being composed of longitudinal rods spaced a short distance apart.

12. The combination with the conduit of a pneumatic conveyer for cotton, of a long head on the outlet end of the conduit, said head being open on the under side and the top of the head being formed of longitudinal rods spaced apart from each other, the rods being reduced in thickness toward their outer ends to increase the width of the spaces between the rods toward the outer end of the head.

GEORGE R. MEYERCORD.
WILLIAM WATERMAN.